US012596430B2

(12) United States Patent
Fahmi et al.

(10) Patent No.: US 12,596,430 B2
(45) Date of Patent: Apr. 7, 2026

(54) HUMAN-COMPUTER INTERFACE FOR MULTIMODAL CONVERSATIONAL INTERACTIONS IN MOBILE CONTEXTS

(71) Applicant: Elide Interfaces Inc., Brooklyn, NY (US)

(72) Inventors: Mina Fahmi, Brooklyn, NY (US); Kirak Hong, Fort Lee, NJ (US)

(73) Assignee: Elide Interfaces Inc., Brooklyn, NY (US)

( * ) Notice: Subject to any disclaimer, the term of this patent is extended or adjusted under 35 U.S.C. 154(b) by 0 days.

(21) Appl. No.: 19/312,777

(22) Filed: Aug. 28, 2025

(65) Prior Publication Data

US 2026/0086627 A1 Mar. 26, 2026

Related U.S. Application Data

(60) Provisional application No. 63/697,353, filed on Sep. 20, 2024.

(51) Int. Cl.
| | |
|---|---|
| *G06F 3/01* | (2006.01) |
| *G06F 3/0346* | (2013.01) |
| *G06F 3/16* | (2006.01) |

(52) U.S. Cl.
CPC .............. *G06F 3/011* (2013.01); *G06F 3/016* (2013.01); *G06F 3/0346* (2013.01); *G06F 3/167* (2013.01)

200

(58) Field of Classification Search
CPC ........ G06F 3/011; G06F 3/016; G06F 3/0346; G06F 3/167
See application file for complete search history.

(56) References Cited

U.S. PATENT DOCUMENTS

| | | | |
|---|---|---|---|
| 11,551,644 B1* | 1/2023 | Sanchez ................. | G08G 1/166 |
| 2015/0338926 A1* | 11/2015 | Park ........................ | G06F 3/014 |
| | | | 345/156 |
| 2016/0292563 A1* | 10/2016 | Park ........................ | G06F 3/016 |
| 2021/0086070 A1* | 3/2021 | Albright ................. | G06F 3/167 |
| 2022/0121288 A1* | 4/2022 | Wu ........................ | G06F 1/1698 |
| 2024/0103626 A1* | 3/2024 | Chen ................. | G06F 3/03547 |
| 2024/0430383 A1* | 12/2024 | Sukumar ................. | G06F 3/011 |
| 2025/0072842 A1* | 3/2025 | Kwon ................. | A61B 5/6826 |

FOREIGN PATENT DOCUMENTS

| | | |
|---|---|---|
| EP | 4443275 | 10/2024 |

* cited by examiner

*Primary Examiner* — Kenneth B Lee, Jr.
(74) *Attorney, Agent, or Firm* — Van Pelt, Yi & James LLP

(57) ABSTRACT

A physical input from a user is detected at a sensor included in an annular member having a central opening. Audio from the user is received at a microphone included in the annular member. Feedback is provided to the user by a feedback indicator included in the annular member. The received audio is provided to a computing device from a communication interface included in the annular member.

19 Claims, 12 Drawing Sheets

100

Head-Worn Device
120

Mobile Device
122

User Devices
118

AI Service
116

Physical Input Sensor
104

Directional Microphone
106

Other Sensors
108

Feedback Indicators
110

Communication Interface
112

Controller
114

Interface Device
102

200

204

206

202

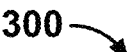
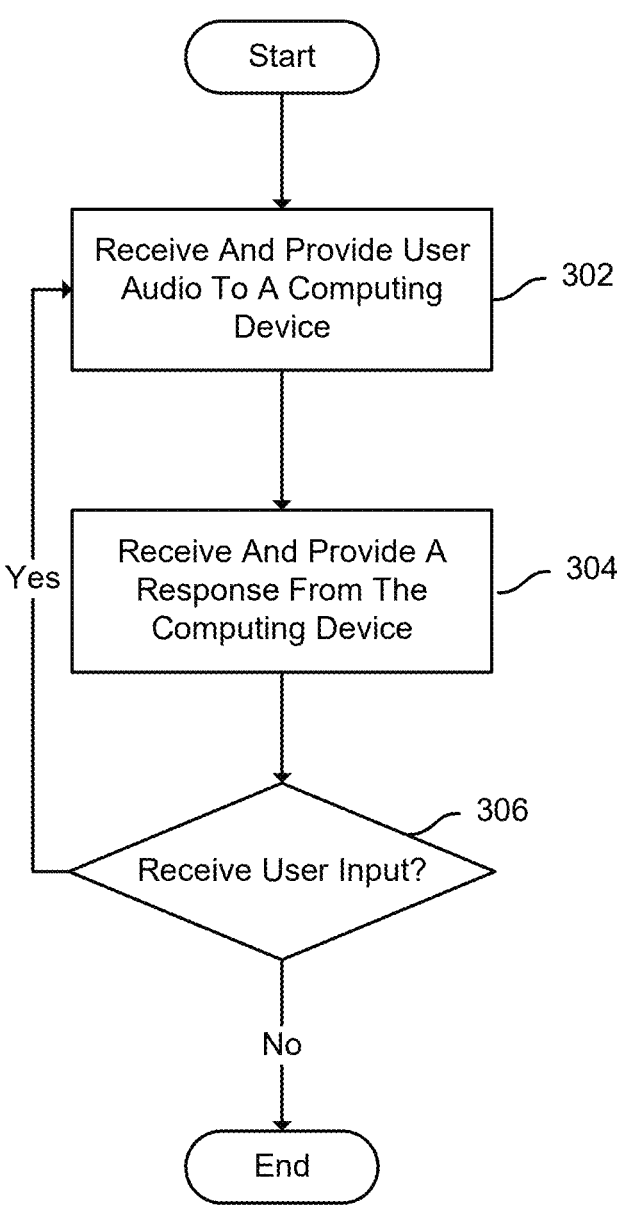
FIG. 3A

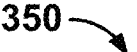
350
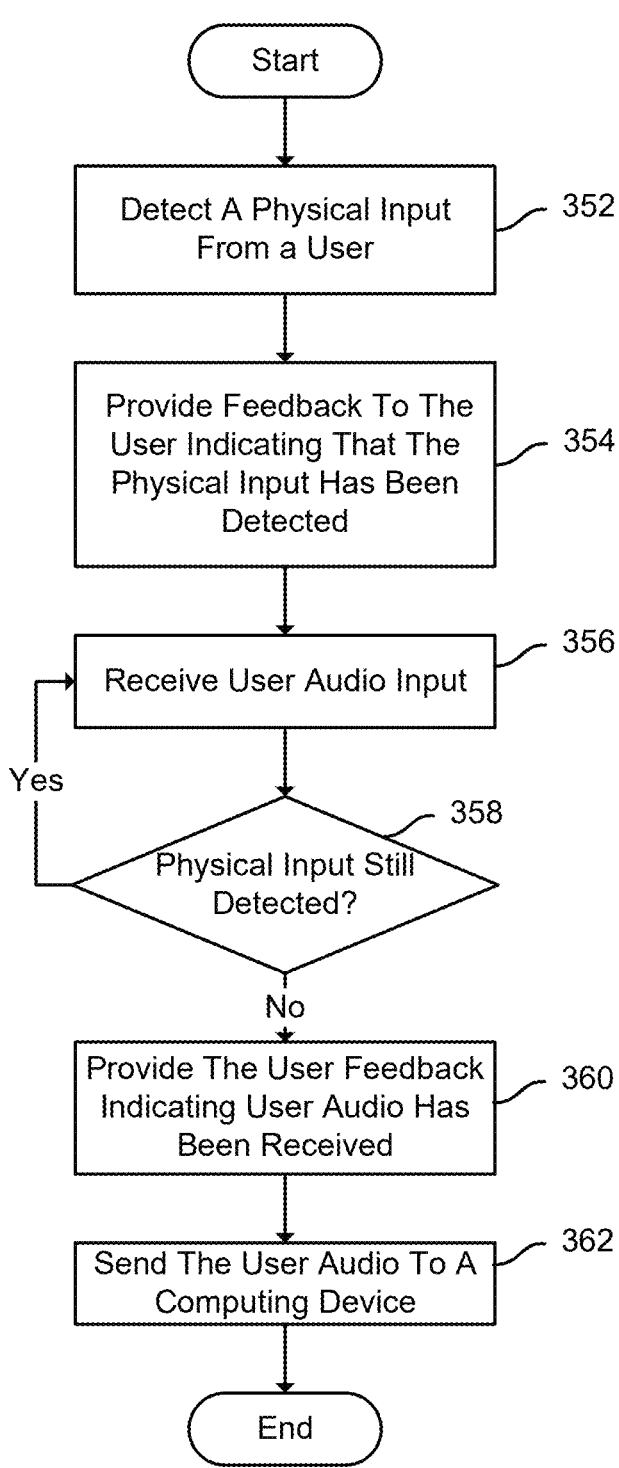
Start
Detect A Physical Input
From a User — 352
Provide Feedback To The
User Indicating That The
Physical Input Has Been
Detected — 354
Receive User Audio Input — 356
Yes
Physical Input Still
Detected? — 358
No
Provide The User Feedback
Indicating User Audio Has
Been Received — 360
Send The User Audio To A
Computing Device — 362
End
FIG. 3B

400

600

<table>
<tr><td>
Tap
Press, Release<Xms
<u>602</u>
</td><td>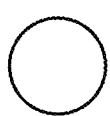</td></tr>
<tr><td>
Dtap
2x Tap Within Xms
<u>604</u>
</td><td></td></tr>
<tr><td>
Press + Hold
Press, Release > Xms
<u>606</u>
</td><td></td></tr>
<tr><td>
Swipe
Up/Down
<u>608</u>
</td><td>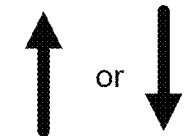</td></tr>
<tr><td>
Hold + Swipe Up/Down
Press, Up/Down within Xms
<u>610</u>
</td><td>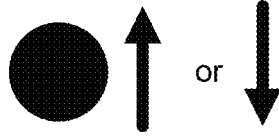</td></tr>
<tr><td>
Double Swipe
2x Up/Down within Xms
<u>612</u>
</td><td>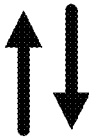</td></tr>
</table>

FIG. 6

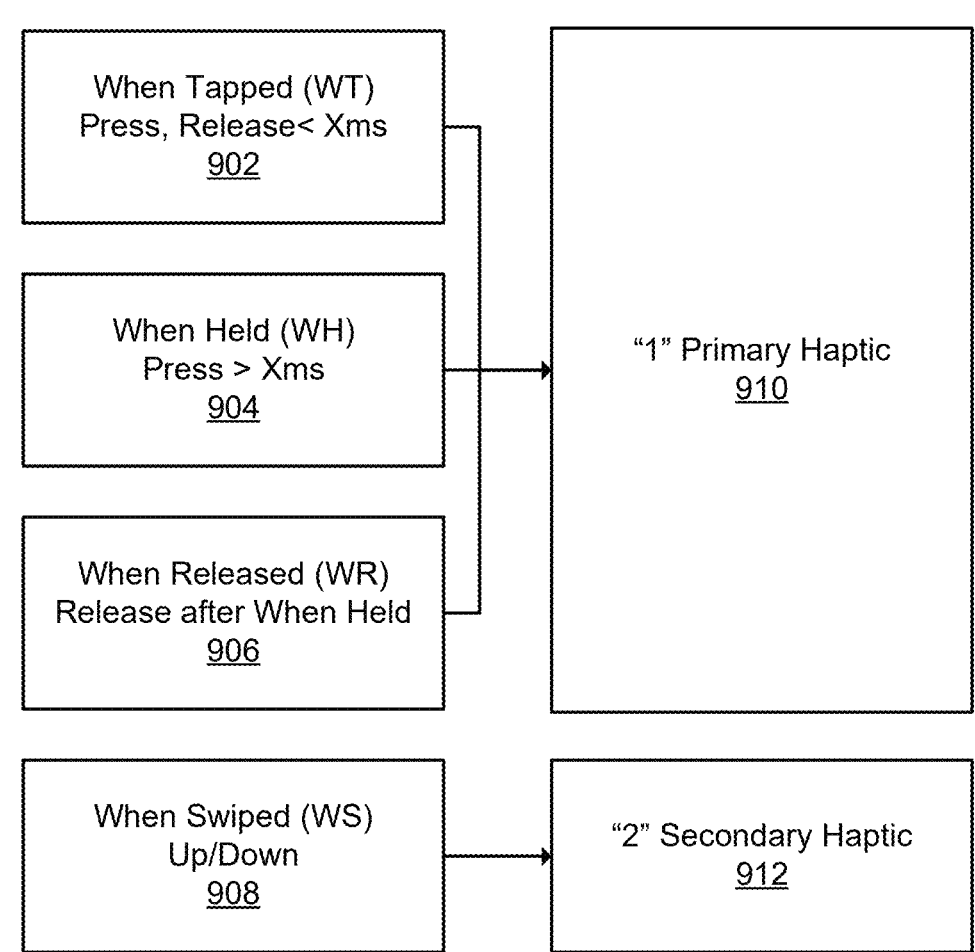
FIG. 9

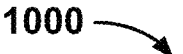
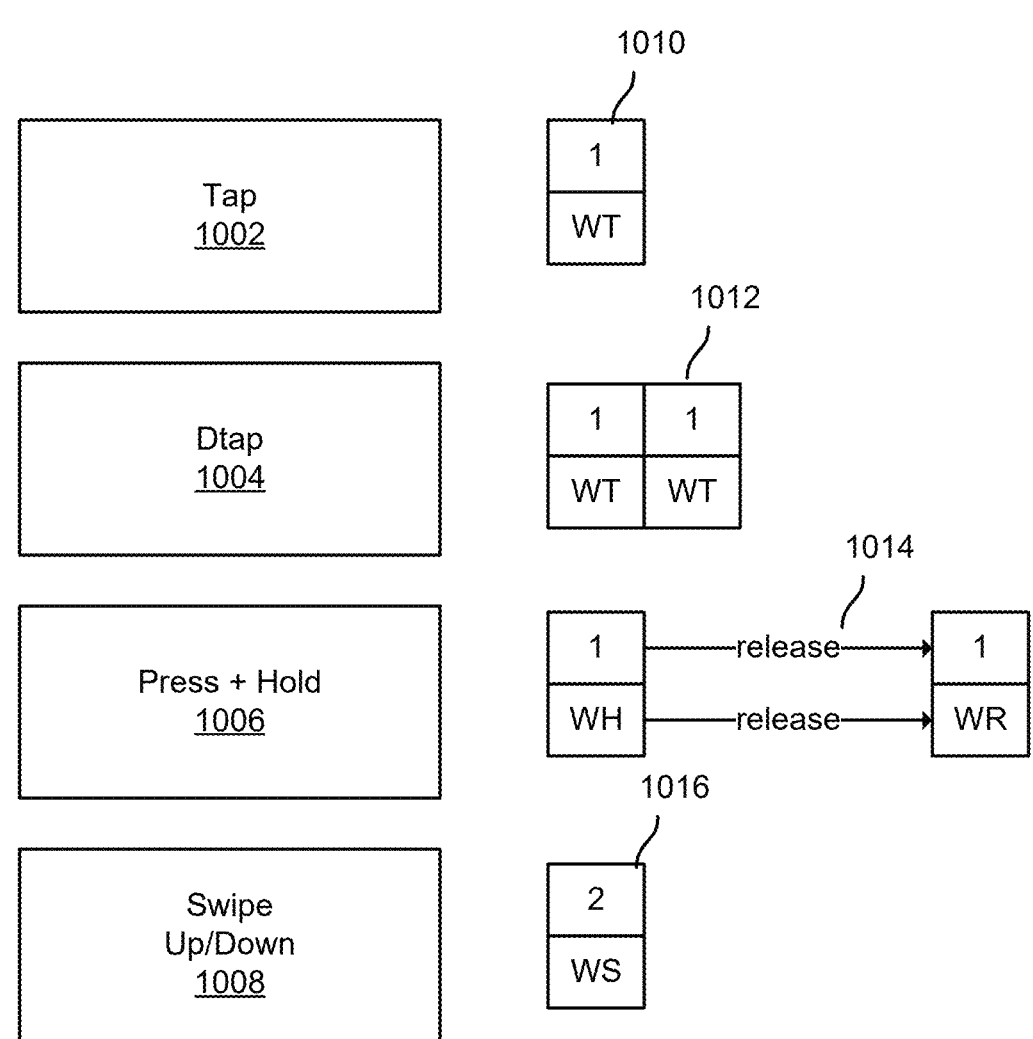
FIG. 10

1100

HUMAN-COMPUTER INTERFACE FOR MULTIMODAL CONVERSATIONAL INTERACTIONS IN MOBILE CONTEXTS

CROSS REFERENCE TO OTHER APPLICATIONS

This application claims priority to U.S. Provisional Patent Application No. 63/697,353 entitled HUMAN-COMPUTER INTERFACE FOR MULTIMODAL CONVERSATIONAL INTERACTIONS IN MOBILE CONTEXTS filed Sep. 20, 2024 which is incorporated herein by reference for all purposes.

BACKGROUND OF THE INVENTION

Artificial Intelligence (AI) provides users with the ability to have interactions with computing devices which resemble human conversations. Speech-to-text technology allows users to interact with AI through spoken language. These technologies enable voice-based conversational interactions. A user might use a variety of devices alone or together to engage with the AI. Examples of devices include their phone, smart glasses, or earbuds. However, these devices may not be ideal in some circumstances. For example, conversations in public may be overheard, potentially exposing sensitive information. Additionally, user input may be interrupted, and there can be challenges when incorporating visual input or when removing and operating devices, leading to user friction in the experience.

BRIEF DESCRIPTION OF THE DRAWINGS

Various embodiments of the invention are disclosed in the following detailed description and the accompanying drawings.

FIG. 3A is a flow diagram of a process for a dynamic back-and-forth conversation between a user and a computing device in accordance with some embodiments.

FIG. 3B is a flow diagram of a process for sending user audio to a computing device in accordance with some embodiments.

FIG. 6 is a diagram of input primitives which can be used to interact with a device in accordance with some embodiments.

FIG. 9 is a block diagram illustrating haptic triggers which correspond to haptic types in accordance with some embodiments.

FIG. 10 is a block diagram illustrating input to haptic response mappings in accordance with some embodiments.

DETAILED DESCRIPTION

Figure 1:
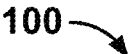
FIG. 1 is a block diagram of a system for facilitating multimodal interactions with a computing device implementing an AI service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

AI which includes large language models (LLMs) (e.g., ChatGPT™, Google Gemini™, Claude AI™, etc.) can be used to facilitate conversational interactions with devices. Users may use one or more devices to facilitate these conversational interactions. Examples of devices include wearable devices, mobile devices, computers, laptops, headphones, etc. However, it is difficult to incorporate all of these devices in a manner that provides a desirable user experience when engaging in conversational interactions with an AI. The user experience may be especially difficult in a variety of settings such as when in a crowded place, on-the-go, in the middle of a conversation with other humans, driving, exercising, etc.

Furthermore, users would like to be able to use multimodal forms of interactions to engage in these interactions with the AI. This can be difficult to implement due to the nature of AI software and the devices which users use to facilitate these multimodal interactions. Multimodal interaction allows users to communicate using multiple modes or channels-such as speech, touch, gestures, facial expressions, and/or visual inputs-either simultaneously or interchangeably. Multimodal interactions can enhance user experience and improve communication efficiency.

Current solutions include purely text-based interactions with AI. These solutions are undesirable in many situations because they require the user to engage directly with the device, such as typing on a screen, thereby preventing the user from focusing on other tasks. Other solutions include features that allow the user to press a button, after which they can use their voice to interact with AI and receive audio-based responses from the AI. However, these solutions still often fall short of delivering a seamless user experience. In many cases, they require the user to be in close proximity to the device, speak clearly in a quiet environment, or press a physical button to initiate interaction, which may not be practical or safe while multitasking or performing other tasks.

For example, current solutions often rely on the user's mobile device (e.g., a smartphone) to interact with an AI. This typically requires the user to retrieve their mobile device, click a button, position their mobile device near their mouth, and speak into the mobile device's microphone. This is a process that is wrought with friction for the user, especially when the user is in certain situations like being on-the-go. In noisy environments, such as subways, background sounds may interfere with speech recognition, causing the mobile device to misinterpret what the user is saying. Social discomfort can also arise, as speaking loudly in public may feel inappropriate. Furthermore, conversations in public may be overheard or expose sensitive information. The user input may be interrupted and incorporating visual input when operating the mobile device can present challenges. This visual input may be necessary for the user to interact with the mobile device and have a conversation with the mobile device. For example, the user may need to read what was said in a chat response from an AI. However, the user may not desire to use the mobile phone in their hands.

Current solutions also include AI software that hinders seamless conversational interactions with the user. For example, in systems that support voice-based queries, the AI may have difficulty understanding when to listen to a user, when the user is done with the query, and when the AI can respond. Furthermore, while the AI is responding, the user may have difficulty efficiently interrupting the AI if the user shifts focus to another topic. Even further, it can be difficult for the user to stop the response from the AI at a desirable time. In certain scenarios, an AI software will provide the user with more information than necessary when the user does not want to listen. In these scenarios, it can be difficult to interrupt the AI especially when the AI system supports voice-based queries.

To further illustrate the limitations of current solutions, consider the following scenario: a user, accompanied by a group of friends, is visiting an art museum and preparing to enter a James Turrell exhibit. The user wishes to engage an AI system to learn more about James Turrell before entering. He retrieves his phone, activates the voice assistant, and attempts to issue the query, "Tell me about James Turrell." However, the device's microphone inadvertently captures audio from a nearby conversation, rendering the voice command ineffective. As a result, the user must manually type the request. Upon doing so, the AI begins delivering a lengthy monologue about James Turrell. Midway through the response, the group enters the exhibit, and the user becomes interested in a specific piece. Unfortunately, the system can make it difficult for the user to interrupt or redirect the conversation. This interaction exemplifies a lack of fluid, human-like conversational dynamics—an essential characteristic that would significantly enhance usability and user satisfaction.

The systems and methods disclosed herein provide a user with the ability to engage in seamless interactions with a computing device across a variety of environmental contexts, including mobile, indoor, outdoor, and noisy environments. In various embodiments, a system as disclosed herein includes a wearable device having a physical input sensor, a directional microphone, and a processor. The processor is configured to receive input signals from the physical input sensor, provide feedback to the user indicating that a command associated with the physical input was received, and facilitate a dynamic back-and-forth conversation between the user and the AI service. In some embodiments, the systems and methods disclosed herein include detecting a physical input from a user, initiating a dynamic back-and-forth conversation with the user and a computing device, providing feedback to the user indicating that a dynamic back-and-forth conversation associated was initiated, and receiving a first user audio input.

The systems and methods disclosed herein provide a human-computer interface which enables private, socially acceptable voice interactions in on-the-go contexts. They further support highly accurate end-pointing (i.e., start/stop) of voice interactions, as well as fast, ergonomic visual input for visual queries. Additionally, the systems and methods disclosed herein provide a solution for easy donning and doffing, enhancing overall usability.

FIG. 1 is a block diagram of a system for facilitating multimodal interactions with a computing device implementing an AI service in accordance with some embodiments. System 100 demonstrates how a user may use one or more devices (e.g., user devices 118 and/or interface device 102) to interact with an artificial intelligence (AI) service 116.

Interface device 102 is a device which a user can use to facilitate multimodal interaction with one or more computers. In some embodiments, interface device 102 is a wearable device. In the example shown, interface device 102 facilitates interactions with user device 118 and an AI service 116. In some embodiments, interface device 102 is configured to directly interact with AI service 116. In some embodiments, interface device 102 is configured to interact with AI service 116 via a user device 118. In some embodiments, AI service 116 is hosted on mobile device 122 and interface device 102 interacts with AI service 116 via mobile device 118.

In some embodiments, interface device 102 is configured such that ergonomic communication with other devices is made possible (e.g., communication is easy for the user). For example, interface device 102 may be configured to use natural gestures to receive input from a user e.g., directional microphone 106 may be positioned to allow very quiet audio input from a user when the user brings their hand to their mouth.

An example of wearable device includes any finger-worn device (e.g., a ring). When interface device 102 is a finger worn device, there are certain motions which may be used to facilitate multimodal communication. For example, interface device 102 may be worn on a first finger (e.g., an index finger) and physical input sensor 104 may be positioned such that receiving an input from a second finger (e.g., a thumb) is natural for the user to perform. The two-finger maneuver may be a mechanism in which the user can send commands to interface device 102 such as a command to turn on the microphone and receive audio.

Interface device 102 includes physical input sensor 104. Physical input sensor 104 can be used to receive a physical input from the user. Examples of physical inputs that can be sensed include touching, tapping, swiping, applying pressure to, pressing, holding, dragging, sliding, moving, releasing, hovering (with proximity sensors), etc. Physical input sensor 104 may be comprised of one or more components that enable detection of a physical input. Examples of these components include buttons, touch screens, pressure sensors, capacitive sensors, resistive sensors, mechanical switches, touchpads, proximity sensors, force sensors, strain gauges, magnetic sensors, capacitive touch panels, gesture recognition sensors, optical sensors, motion detectors, etc. In some embodiments, physical input sensor 104 is comprised of a capacitance surface, a force sensor, and an accelerometer.

In some embodiments, physical input sensor 104 senses a physical input and sends information about the physical input (e.g., double tap, single tap, press and hold etc.) to controller 114 to cause an action (e.g., instruct the device to begin listening for a command). In some embodiments, in response to a physical input being sensed, interface device 102 uses feedback indicators 110 to provide feedback to the user that the input has been received. In some embodiments, feedback indicators 110 send input feedback to the user. This allows the user to have a better understanding of whether the intended instruction was communicated to interface device 102.

In some embodiments, physical input sensor 104 is used to sense a physical input which can be used to facilitate a dynamic back-and-forth conversation. For example, physical input sensor 104 may sense a touch while interface device 102 is in the process of communicating (e.g., to the user) and or receiving a response from AI service 116. This may cause interface device 102 to seize receiving/communicating the response. This input may be used to allow the user to provide more input and/or interrupt output from being received or communicated by interface device 102. The output may be in the form of output (e.g., an AI voice responding to a query) emanating directly from interface device 102 or from one of user devices 118. In some embodiments, the output is in the form of audio output and an associated text output. In one example, mobile device 122 may include the text corresponding to an audio output which is being sent to head-worn device 120.

In some embodiments, the user can accurately end-point the start or end of their voice input via a gesture on interface device 102 (e.g. "held" records, "released" ends recording). In some embodiments, end-pointing occurs regardless of whether the finger-worn or head-worn microphones are being used. This can be accomplished using coordination between interface device 102 and head-worn devices 120, possibly via mobile device 122.

In some embodiments, physical input sensor 104 includes an Inertial Measuring Unit (IMU) sensor. An IMU sensor can be used to minimize false positives on the physical input provided by the user. In some embodiments, physical input sensor 104 uses one or more physical input systems (e.g., IMU sensor and capacitance touch system) to sense physical inputs and minimize false positives.

In some embodiments, the user can immediately terminate audio output from head-worn device 120 in response to a gesture inputted to interface device 102. Then, the user can immediately start new voice input via this or a later gesture, enabling accurate and potentially rapid dialogue. In some embodiments, a haptic output in the interface device 102 may optimally provide further signal to the user to identify that a gesture input has been detected.

In some embodiments, a subset of interface device 102 and head-worn device 120 can be dynamically activated based on the position of an interface device 102 (this may be sensed by other sensors 108). Voice input may be received through the activated microphone(s) (e.g., directional microphone 106). This enables discreet, whisper-level voice input when only the hand-worn subset of microphones is activated.

In some embodiments, the capacity of interface device 102 to receive a voice input (e.g., through directional microphone 108) may be controlled by inputs to physical input sensor 104. For example, interface device 102 may be able to receive and send voice input sent while the interface device 102 is in a "held" state (e.g., by the user holding pressure on physical input sensor 104) and deactivated during a "release" state. User input may be detected from interface device 102 during audio output the output may be immediately terminated in response to the input. New audio output may be initiated based on the new input, enabling rapid dialogue.

Directional microphone 106 is a component which allows interface device 102 to receive an audio signal. In some embodiments, directional microphone 106 is configured to receive a voice command from a user. In some embodiments, directional microphone 106 is turned on when a certain physical input is sensed by physical input sensor 104. For example, a single tap on the physical input sensor 104 may instruct controller 114 to enable directional microphone 106 to receive an audio input from the user.

In some embodiments, directional microphone 106 is constantly on and is ready to receive a voice command from a user at any time. For example, directional microphone 106 may be configured to receive a certain command word/phrase to configure interface device 102 to perform an action and/or prepare interface device 102 to receive a second command.

Directional microphone 106 may be configured to receive audio primarily from a close range and a specific direction. As a result, ambient or background noise, such as that of a crowded street, conversations from bystanders, or traffic noise, may be excluded from audio capture. By focusing on sound originating from a targeted direction, i.e., typically where the user is positioned, directional microphone 106 enhances the clarity and quality of captured audio. This results in improved speech recognition accuracy, particularly in noisy or dynamic environments. Additionally, the directional nature of the microphone helps preserve user privacy by limiting the unintended capture of nearby conversations. The use of directional microphone 106 also reduces the need for complex noise cancellation algorithms, leading to lower processing overhead and faster system responsiveness.

Other sensors 108 may include a variety of other sensors which may be used to operate interface device 102. Examples of other sensors 108 include: gyroscopes, accelerometers, magnetometers, proximity sensors, ambient light sensors, temperature sensors, humidity sensors, pressure sensors, infrared sensors, ultrasonic sensors, resistive sensors, optical sensors, biometric sensors, hall effect sensors, vibration sensors, force sensors, etc. Sensors such as gyroscopes and accelerometers may be used by interface device 102 to receive input from a user that is generated by movement. For example, in embodiments where interface device 102 is a finger-worn device, other sensors 108 may be used to sense when the user's hand is brought up to the face of the user. This input may be used as an indication that directional microphone 108 should be activated and ready to receive an audio input. An example of other sensors 108 being used to sense user motion is demonstrated in FIGS. 5A-5C.

In some embodiments, an accelerometer included in other sensors 108 is used to determine when interface device 102 should transition from a lower-power state to an active state. This allows the system to conserve power by activating interface device 102 in response to motion or relevant activity being detected.

Feedback indicators 110 includes one or more components which can provide feedback that is sensible by the user using interface device 102. Examples of feedback indicators 110 include light-emitting diode (LED) lights, screens, vibrators, speakers, buzzers, haptic actuators, e-ink displays, status indicators, backlights, voice output systems, tactile feedback motors, ambient light indicators, etc. Examples of sensed feedback that feedback indicators 110 can provide include: vibrations, haptic feedback, visual feedback, auditory feedback, light pulses, screen animations, color changes, flashing indicators, sound tones, voice prompts, alert beeps, display messages, tactile pulses, LED blinking patterns, on-screen icons, etc.

In some embodiments, feedback indicators 110 include a button the provides feedback to a user after being pressed.

Feedback indicators 110 may use one or more types of feedback to facilitate a multimodal interaction with a user. For example, the user may tap physical input sensor 104 and feedback indicators 110 may cause interface device 102 to vibrate indicating that the tap was properly received. This may be particularly useful when interface device 102 is a worn device. This allows the user to receive feedback from interface device 102 without having to look at mobile device 122. Providing feedback without requiring the user to look at mobile device 122 enables seamless and intuitive interactions, especially in hands-free or on-the-go scenarios (e.g., walking, driving, or exercising). It reduces cognitive load, minimizes distraction, and supports more natural, glance-free operation. Furthermore, distinct vibration patterns may be used to correspond to different types of inputs, commands, or device states, allowing the user to interpret the feedback through touch alone and maintain continuous awareness of system behavior.

In some embodiments, feedback indicators 110 provide haptic feedback to the user. For example, the haptic may be a certain vibration pattern. This may be provided in response to receiving an input from the use of interface device 102. In some embodiments, certain haptics are provided in response to certain input from the user. Examples of certain haptics that correspond to certain inputs from the user are provided in FIG. 10.

Communication interface 112 may comprise of one or more communication systems that communicate to external devices/systems. Communication interface 112 may include components for enabling Bluetooth, Wi-Fi, NFC, cellular connections, Global Positioning System (GPS) communications, etc. Communication interface 112 may include infrared transmitters, ultra-wideband (UWB) transmitters, Zigbee transmitters, ANT+, RFID, LoRa module, eSIMs, etc. In some embodiments, interface device 102 uses short range wireless communication with user devices 118 to send commands to use the longer-range capabilities of user devices 118 to communicate with AI service 116.

Communication interface 112 is used to communicate data between interface device 102 and any other external devices/systems (e.g., user devices 118, and AI service 116). In some embodiments, communication interface 112 sends requests to AI service 116. For example, communication interface 112 may send a query that corresponds to a user's request. The users request may be a part of a dynamic back-and-forth conversation like interaction with AI service 116 that is being facilitated by interface device 102. For example, the interface device 102 may receive audio input from the user through directional microphone 106, wherein the input includes a request to AI service 116 for information on a certain topic. Communication interface 112 may send this audio to AI service 116. AI service 116 may receive this audio request, generate a response, and send this response to communication interface 112. In some embodiments, the response is provided to mobile device 122 or head-worn device 120. In some embodiments, an audio request from the user is transformed into a textual request and forwarded to AI service 116 for a response.

User devices 118 includes one or more devices used by a user and associated with interface device 102 (e.g., configured to communicate with interface device 102 through communication interface 112). In some embodiments, user devices 118 include mobile device 122 and/or head-worn device 120. User devices 118 may include one or more of the devices shown and/or one or more of other types of devices associated with the user. User devices 118 may also include stationary computers such as desktop computers, servers, monitors, etc.

Mobile device 122 is a computing device, such as a mobile phone, tablet, smart phone, smart watch, laptop, e-reader, portable gaming console, a mobile general-purpose compute device, etc.

Head-worn device 120 may be headphones, earphones, earpieces, helmets, smart glasses, head-mounted displays, etc. In some embodiments, head-worn device 120 is paired with mobile device 122 (e.g., through Bluetooth). In some embodiments, head-worn device 120 receives auditory data from interface device 102. In some embodiments, the user receives auditory data from interface device 102 via a speaker that is not head-worn.

In some embodiments, head-worn device 120 includes a microphone that can be configured to receive audio input from a user.

In some embodiments, a user can provide voice-input via either interface device 102 or head-worn device 120. In some embodiments, when the user's arm is raised (detected via orientation sensors), a finger-worn microphone (e.g., directional microphone 106) is activated for voice input, enabling discreet, whisper-level interactions. When the user's arm is lowered, head-worn device 120 may be activated for voice input, affording greater flexibility.

Fast, Ergonomic Visual Input

In some embodiments, a user can initiate visual input on the head-worn device 120 (e.g., in embodiments where head-worn device 120 includes a visual output (e.g., smart-glasses) via gesture input on a finger-worn device. This allows the user to initiate visual capture in the same gesture or consecutive action as initiating voice input, which improves speed. It also allows the user to initiate visual capture in any arm position without reaching up to head-worn device 120, which improves ergonomics. In some embodiments, the visual input sensors on the head-worn device 120 are oriented in the general forward direction of the user's gaze. Visual and/or orientation sensors in head-worn device 120 indicate if the direction of the visual sensors are correctly oriented with the user's gaze. In some embodiments, in response to a determination that these sensors are improperly oriented, system 100 provides audio feedback to the user to correct the orientation and/or processes the image to correct the orientation.

In some embodiments, input signals are monitored from a hand-worn device (e.g., interface device 102). In response to detecting an input signal, image capture via one or more head-worn camera devices is initiated. In some embodiments, head positioning data gathered through sensors in head-worn device 120 and is utilized to detect if cameras are in an incorrect orientation relative to the user's field of view and/or adjust camera orientation to provide feedback to the user for correction.

Head-worn device 120 may pre-process captured image data within the head-worn device. Pre-processing may include one or more of the following: image compression, feature extraction, motion stabilization, and/or exposure adjustment.

Figures 5A, 5B, 5C:
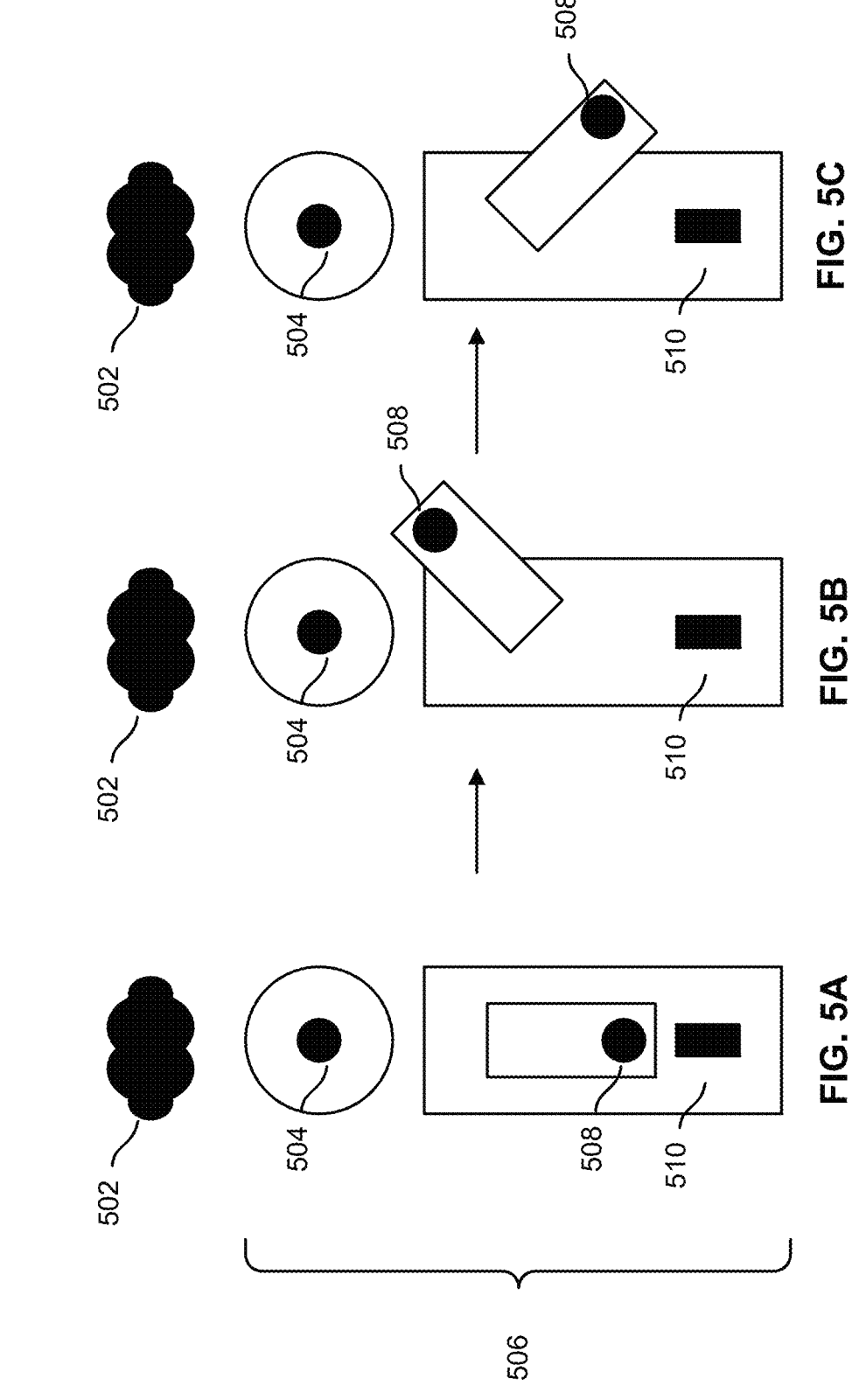
FIG. 5A-5C is a diagram of a user engaging in a multimodal interaction in accordance with some embodiments.

In the example provided in FIGS. 5A-5C, user devices 118 include a head-worn device 120 and a mobile device 122.

In some embodiments, user devices 118 includes a mobile device 122 which is used by interface device 102 to communicate with AI service 116. For example, interface device 102 may directly communicate with a user device of user devices 118 which is used to communicate with an AI service 116 (e.g., an app on user devices 118 which communicates with an AI service 116 that communicates through a network).

To illustrate, communication interface 112 may send an audio signal to a mobile device which is configured to send the audio signal or information associated with the audio signal to an AI service 116. For example, user device 118 may receive an audio signal from interface device 102, convert the audio signal to text, and send the text to AI service 116.

In some embodiments, user devices 118 include a head-worn device 120 which is associated with interface device 102. In some embodiments, the multimodal interaction between the user and AI service 116 may be facilitated through interface device 102 and head-worn device 120 where head-worn device 120 is used to communicate audio that is generated by AI service 116. The audio may be generated in response to an audio request to interface device 102. This configuration may eliminate the need for a user device such as mobile device 122.

In some embodiments, interface device 102 is used to control mobile device 122 (or other user devices 118). For example, interface device 102 may include a state which allows the user to use the phone capabilities of mobile device 122. Interface device 102 may also be used to control other functions of mobile device 122 such as playing music, accessing a voice assistant, taking notes, sending text messages, etc. In some embodiments, interface device 102 functions as a microphone of the mobile device 122 (e.g., using directional microphone 106).

In some embodiments, interface device 102 may utilize AI service 116 to facilitate interactions with user devices 118. For example, the AI service may receive a user command to increase the volume on a specific user device, and in response, the user device may execute the command accordingly.

In some embodiments, system 100 lacks a head-worn device 120. In some embodiments, interface device 102 is configured to receive a physical input from the user, detect a corresponding audio input, and store the audio data or a transcription thereof. Feedback indicator 110 may provide haptic feedback to indicate that the audio input has been successfully received and stored by interface device 102. This feedback mechanism may reduce the likelihood of the user repeating or unnecessarily re-initiating the physical input. For example, a user operating system 100 without head-worn device 120 may activate physical input sensor 104, receive haptic feedback, position interface device 102 near the user's mouth, and issue a spoken command (e.g., to add an item to a shopping list) into directional microphone

106. In such an embodiment, interface device 102 may be configured to store the information. In some embodiments, the information is stored on mobile device 122.

Controller 114 may include microcontrollers, chips, digital signal processors, memory (e.g., flash memory and/or random-access memory (RAM)), battery management controllers, ports such as general-purpose input/output pins for device control, serial interfaces, computer processing units (CPUs), etc. Controller 114 may include components configured to handle the processing, communication, power management, etc. of interface device 102.

AI service 116 is a service that includes artificial intelligence and/or machine learning (ML) systems. For example, AI service 116 may be the server of a public or private large language model (LLM) (e.g., ChatGPT™, Google Gemini™, Claude AI™, etc.). In some embodiments, AI service 116 is configured to allow the user to use interface device 102 to interact with an AI (e.g., an LLM) in a multimodal fashion. For example, AI service 116 may incorporate an application programming interface (API) designed to allow interruption of a response being generated by a third-party large language model (LLM) service (e.g., ChatGPT™) when an input is detected by physical input sensor 104.

In some embodiments, AI service 116 is designed specifically to integrate natively with interface device 102, eliminating the need for an intermediary API wrapper. For example, AI service 116 may be configured to directly receive input signals from physical input sensor 104, allowing for seamless interaction between the hardware and AI functionality.

AI service 116 may be hosted on the cloud, on a local server, on-device (e.g., embedded within user devices 118 and/or interface device 102), within an edge computing environment, etc. In a cloud-based implementation, AI service 116 can leverage scalable infrastructure provided by platforms such as AWS™, Azure™, or Google Cloud™ to process data remotely. In a local server setup, AI service 116 may operate within a private network, offering enhanced control and security. When hosted on-device, AI service 116 can function offline or with minimal connectivity, enabling real-time responses and reducing latency.

AI service 116 may include any components which facilitates a user interaction with artificial intelligence (e.g., embeddings, neural networks, data processors, feature generators, speech-to-text software, text-to-speech software, etc.).

In some embodiments, AI service 116 is included in user devices 118. For example, AI service 116 may be hosted on a mobile phone or a computer. In some embodiments, AI service 116 is included in interface device 102. In some embodiments, communication interface 112 communicates to AI service 116 through user devices 118. In some embodiments, interface device 102 directly communicates with AI service 116.

In some embodiments, system 100 utilizes a distributed software system to manage data processing and system state across the interface device 102, wearable devices of user devices 118, mobile device 122, head-worn device 120, and cloud services (e.g., cloud services associated with AI service 116 and interface device 102). The distributed software system may be configured to enable multimodal conversational interactions in mobile contexts. The distributed software system may maintain state and interactions across all devices. A state may refer to the current condition or mode that interface device 102, user devices 118, and/or AI service are in at a specific moment in time, based on its internal data, inputs, and logic. In some embodiments, the state determines how the device behaves and how it responds to user actions or system events.

Interface device 102 may be able to interact with users using specific flows. An example of such a flow is provided below where interface device 102 is a finger-worn device such as a ring.

1. During onboarding, user pairs head-worn device 120 and a finger-worn device, which is interface device 102, to a mobile device 122. This may be accomplished using a protocol such as Bluetooth.
2. User removes all worn devices from single don/doff case.
3. User wears head-worn device 120 on ears and finger-worn device on index finger of dominant hand.
4. User performs gestures on the finger-worn device with thumb using physical input sensor 104, raises device to mouth (a motion which may be sensed by other sensors 108), and speaks into directional microphone 106.
5. Audio input from finger-worn device is sent to mobile device 122. In some embodiments, before or after providing audio input, or in isolation, the user performs the same or different gesture using the finger-worn device, for example pressing their thumb onto physical input sensor 104.
6. One or more image inputs from head-worn device 120 are sent to mobile device 122.
7. Input is processed on mobile device 122 and/or AI service 116 that are connected to by mobile device 122 or by interface device 102. Processing results in an audio file.
8. Audio output is played to user through head-worn device 120.
9. User presses finger-worn device with thumb mid-audio playback, immediately stopping audio output.
10. User continues 2-8 or other flows as desired
11. User replaces worn devices in don/doff case Distributed Processing In some embodiments, initial data processing and compression of inputs (e.g., audio inputs and/or physical inputs) occur on one or more wearable devices such as interface device 102. In some embodiments, the wearable devices are networked to mobile device 122 via wireless signals (e.g. Bluetooth). Mobile device 122 may perform further computation, including data processing or machine learning model inference. Tasks which require further computation may be routed to networked cloud services through mobile device 122.

In some embodiments, a global state manager on mobile device 122 and/or on the cloud tracks the current mode, recent interactions, and device states. System 100 may dynamically switch modes by remapping inputs and outputs based on the last input and current system state.

Distributed processing allows for a set of operational modes. Examples of operational modes include but are not limited to: AI assistant mode, phone control mode, and music playback mode. In some embodiments, a global state manager on mobile device 122 and/or on the cloud is used to track a current active mode, recent user interactions, device states (hand-worn, head-worn, phone), active applications and their states, and/or current sensor states. In some embodiments, mode switch triggers (user command, application state change, context change) are detected. Examples of mode switch triggers include but are not limited to: gracefully suspending current mode operations, initializing new mode and restoring relative prior state, remapping input sensor-to-application action mappings, and/or providing audio or haptic feedback to confirm mode change.

Mobile device 122 may receive sensor data from the hand-worn and/or head-worn devices (e.g., head-worn device 120), including audio and image data. Mobile device 122 may perform initial processing on the sensor data to determine processing requirements. Mobile device 122 may dynamically decide whether to process data locally or transmit to the cloud based on one or more factors, such as current network conditions and/or task complexity. In some embodiments, mobile device 122 may locally perform tasks such as executing on-device machine learning models for speech recognition, image analysis, and/or natural language processing. Other tasks may include but are not limited to generating system responses based on processed inputs and current state.

Cloud processing may include transmitting relevant data to a cloud server. It may also include receiving processed results and updating system state.

Partial results of ongoing processing may be continuously streamed to head-worn device 120 to enable low-latency audio feedback to the user and/or immediate interruption of audio output upon detecting new user input.

Data persistence may be maintained and/or cached across devices to optimize for future interactions and offline functionality.

Figure 2:
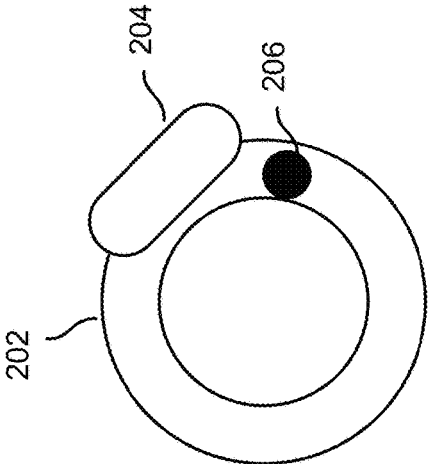
FIG. 2 is an example of a finger-worn device in accordance with some embodiments.

FIG. 2 is an example of a finger-worn device in accordance with some embodiments. System 200 may be an interface device, such as interface device 102.

Finger-worn body 202 comprises a substantially annular body with a central opening dimensioned to be worn around a user's finger. Finger-worn body 202 may be constructed from one or more materials, including but not limited to metal, plastic, ceramic, composite, or a flexible polymer. In some embodiments, finger-worn body 202 houses one or more electronic components configured to provide sensing, communication, processing, or feedback functionality. Other examples of components which are included in finger-worn body 202 include one or more of various sensors, one or more feedback indicators, a communication interface, a controller, etc.

Examples of other sensors include: gyroscopes, accelerometers, proximity sensors, pressure sensors, capacitive sensors, force sensors, etc. Sensors such as gyroscopes and accelerometers may be used by finger-worn body 202 to receive input from a user that is generated by movement. Examples of feedback indicators include LED lights, screens, vibrators, speakers, buzzers, haptic actuators, e-ink displays, notification LEDs, tactile feedback motors, ambient light indicators, visual alert panels, etc. Examples of sensed feedback that feedback indicators can provide include vibrations, haptic feedback, visual feedback, LED blinking patterns, on-screen icons, confirmation chimes, etc.

In this example, finger-worn body 202 includes physical input sensor 204 and directional microphone 206, which are affixed to finger-worn body 202 in any possible manner.

Finger-worn body 202 may include microcontrollers, chips, digital signal processors, memory (e.g., flash memory and/or RAM), battery management controllers, ports such as general-purpose input/output pins for device control, serial interfaces, computer processing units (CPUs), etc. Finger-worn body 202 may include components configured to handle the processing, communication, power management, etc.

Finger-worn body 202 may include a power source (e.g., rechargeable battery), and include wireless communication components (e.g., Bluetooth, NFC, Wi-Fi) to enable data exchange with an external system such as a smartphone, wearable device, or computer.

Finger-worn body 202 may be formed as a unitary structure or include one or more separable or modular components. External surfaces of the ring may include one or more user interfaces, such as touch-sensitive areas, buttons, or gesture-recognition features, to allow user interaction.

Physical input sensor 204 is a device which can receive a physical input and communicate the physical input to other components included in finger-worn body 202. In some embodiments, physical input sensor 204 is positioned such that when finger-worn body 202 is worn by a user on the index finger, the thumb can be used to ergonomically apply a physical input to the physical input sensor 204 (e.g., a tap, double tap, swipe, press+hold, hold+swipe, etc.).

In some embodiments, physical input sensor 204 senses a physical input and instructs components in system 200 to execute an action, such as start receiving audio, interrupting an AI response, begin recording a note, etc. In some embodiments, when physical input sensor 204 senses a physical input, finger-worn body 202 is configured to provide feedback to the user. In some embodiments, the feedback (e.g., a haptic) may correspond to the command that was received.

In some embodiments, the command is to facilitate a dynamic back-and-forth conversation between the user and a computer (e.g., an AI server, a mobile device, etc.). The command may cause directional microphone 206 to begin waiting to accept a voice message which can be sent to the computer. In some embodiments, the command is to interrupt an AI chatbot in the middle of a response during a dynamic back-and-forth conversation. In response to the physical input being received, the response that is being provided by the AI chatbot will be stopped.

Directional microphone 206 is a component which can receive audio information, such as a voice command from a user. In some embodiments, directional microphone 206 is activated to receive audio information when physical input sensor 104 receives a physical input.

Directional microphone 206 may be positioned to enable a user wearing system 200 to easily and quietly speak into directional microphone 206. The positioning of directional microphone 206 may take advantage of the fact that people naturally bring their hands to their lips in a certain configuration. Thus, directional microphone 206 is positioned such that when this natural action occurs, the user can easily speak into the microphone without adjusting the natural movement of bringing hands to the face. This further enables the user to communicate with a device with a high degree of subtlety and speed.

An example of how system 200 can be used is provided. Finger-worn body 202 is worn on a user's index finger with physical input sensor 204 facing the user's thumb. Thus, a gesture of touching physical input sensor 204 can be quickly and effectively performed. The finger-worn body 202 will then be brought up to the face in one of the most ergonomic gestures that a human is familiar with performing. This is because humans touch their face often. In some embodiments, when the finger-worn body 202 is near the face, the user can press and hold pressure to the physical input sensor 204, speak into directional microphone 206 and release the hold when the user is done speaking. This process may be similar to a walkie-talkie process. The configuration of system 200 eliminates the need for a wake word. The configuration of system 200 also provides the user with perfect end pointing, as the user can stop talking while still holding the ring, think, and then finish speaking. Current solutions like a ChatGPT™ Voice will begin speaking if the user trails off while thinking because the current solutions can't know if the user is done speaking or not.

In some embodiments, the user can provide audio information (e.g., speak to) system 200 through a microphone in a device which is connected to system 200 (e.g., through a wireless connection and/or a wired connection). For example, a head-worn device may be able to record the user and provide the audio to system 200.

In some embodiments, system 200 can be kept at the user side while the user uses physical input sensor 204 to trigger another microphone (e.g., in a paired head-worn device) and speak to system 200 through that microphone.

FIG. 3A is a flow diagram of a process for a dynamic back-and-forth conversation between a user and a computing device in accordance with some embodiments. Process 300 may be executed by an interface device, such as interface device 102.

At 302, user audio is received and provided to a computing device. User audio may include any audio data from the user, e.g., a question, a start to a conversation, a part of a conversation, etc. The user audio may be received at an audio capture device such as a microphone. The computing device may be any computing device (e.g., a user device, a device in the cloud). In some embodiments, the audio is sent to a second computing device via a first computing device. In some embodiments, the computing device includes an AI service which can generate a response to the user audio. The user audio may be provided to the computing device through wireless means such as Bluetooth, Wi-Fi, NFC, cellular connections, etc. In some embodiments, the user initiates the device to receive user audio by providing a physical input.

At 304, a response from the computing device is received and provided. The generated response may mimic natural human conversation in tone, structure, and contextual relevance, it may include appropriate emotional nuance and coherence. The generated response may be used to facilitate a conversation like interaction with the user. In some embodiments, the user can interrupt the response as it is being is provided.

At 306, it is determined whether a user input is received. A user input may include physical input from the user. The physical input may be received at a physical input sensor.

In response to a determination that a user input has been received process 300 continues to 302. This may be so the user can provide further audio input. For example, the user may need to interrupt a response from an AI to include more information. In some embodiments, the user input is received while the response is being provided to the user.

In response to a determination that a user input has not been received process 300 ends.

FIG. 3B is a flow diagram of a process for sending user audio to a computing device in accordance with some embodiments. Process 350 may be executed by an interface device such as interface device 102. Process 350 may be executed on a system that can be worn on a finger such as system 200. In some embodiments, process 350 is used to perform some or all of 302.

At 352, a physical input from a user is detected. The detected physical input may include an input that can be initiated, held, and discontinued. For example, a tap plus hold input may be initiated by a tap, held by holding pressure on the sensor, and discontinued by releasing the hold. In some embodiments, a device executing process 350 is worn on a first finger and the physical input includes an action by a second finger. For example, the device may be worn on the index finger and a physical input sensor may be positioned such that the thumb can provide a physical input to the device. In some embodiments, a physical input sensor is positioned on a finger-worn device worn on a first finger, such that a second finger can easily execute a tap plus hold input. In some embodiments, the device executing process 350 is configured to initiate a dynamic back-and-forth conversation upon detecting a physical input from the user. In some embodiments, the device is worn on a first finger and the physical input from the user includes an action by a second finger that is sensed by a physical input sensor.

At 354, feedback is provided to the user indicating that the physical input has been detected. The feedback may include haptic feedback such as a certain vibration pattern. This feedback may allow the user to understand that a command to initiate the dynamic back-and-forth conversation has been successfully received and executed. In some embodiments, the user now knows that the device will receive the users audio input. This feedback may be provided by a feedback indicator. Examples of feedback include vibrations, haptic feedback, visual feedback, auditory feedback, light pulses, screen animations, color changes, flashing indicators, sound tones, voice prompts, alert beeps, display messages, tactile pulses, LED blinking patterns, on-screen icons, confirmation chimes, etc.

At 356, the audio input is received. The device includes a directional microphone that enables the user to provide user audio input quietly (e.g., whisper into the device). This allows the user to access a dynamic back-and-forth conversation in a socially acceptable manner while in a public area. The user's audio input may comprise of the user speaking naturally as if the user is speaking to another human. For example, the user may query the device for any information. The user may also command the device to execute a second action like turning on or off music.

At 358, it is determined whether or not the physical input is still detected. For example, if the physical input includes holding a second finger (e.g., a thumb) on the physical input sensor, the physical input will cease to be detected when the thumb is released from the physical input sensor.

In response to a determination that the physical input is still detected, process 350 proceeds to 356 and continues to receive the user audio input. In this case, the user is indicating to the device that the user would like to continue to provide audio input.

In response to a determination that the physical input is not detected, process 350 proceeds to step 360. In this case, the user is indicating that a response from the computer is desired and that the user is done providing audio input.

At 360, feedback indicating that the user audio has been received is provided to the user. The device may provide feedback through a feedback indicator. Examples of feedback include vibrations, haptic feedback, visual feedback, auditory feedback, light pulses, screen animations, color changes, flashing indicators, sound tones, voice prompts, alert beeps, display messages, tactile pulses, LED blinking patterns, on-screen icons, etc. Haptic feedback may be any feedback relating to the sense of touch and/or proprioception.

At 362, the user audio is sent to a computing device. In some embodiments, the user audio is provided to the computing device directly from the user through a user device (e.g., an interface device). The user device may receive the audio after sensing that a physical input has stopped. For example, the user device may receive the user audio after step 356 of process 350 is executed. The computing device may include an includes an AI service which is capable of generating responses to the user audio. The generated response may mimic natural human conversation in tone, structure, and contextual relevance, it may include appropriate emotional nuance and coherence. The generated response may be used to facilitate a conversation like interaction with the user. In some embodiments, the user audio is converted into text and used on the AI service. For example, the AI service may be an LLM which only accepts text.

Figure 4:
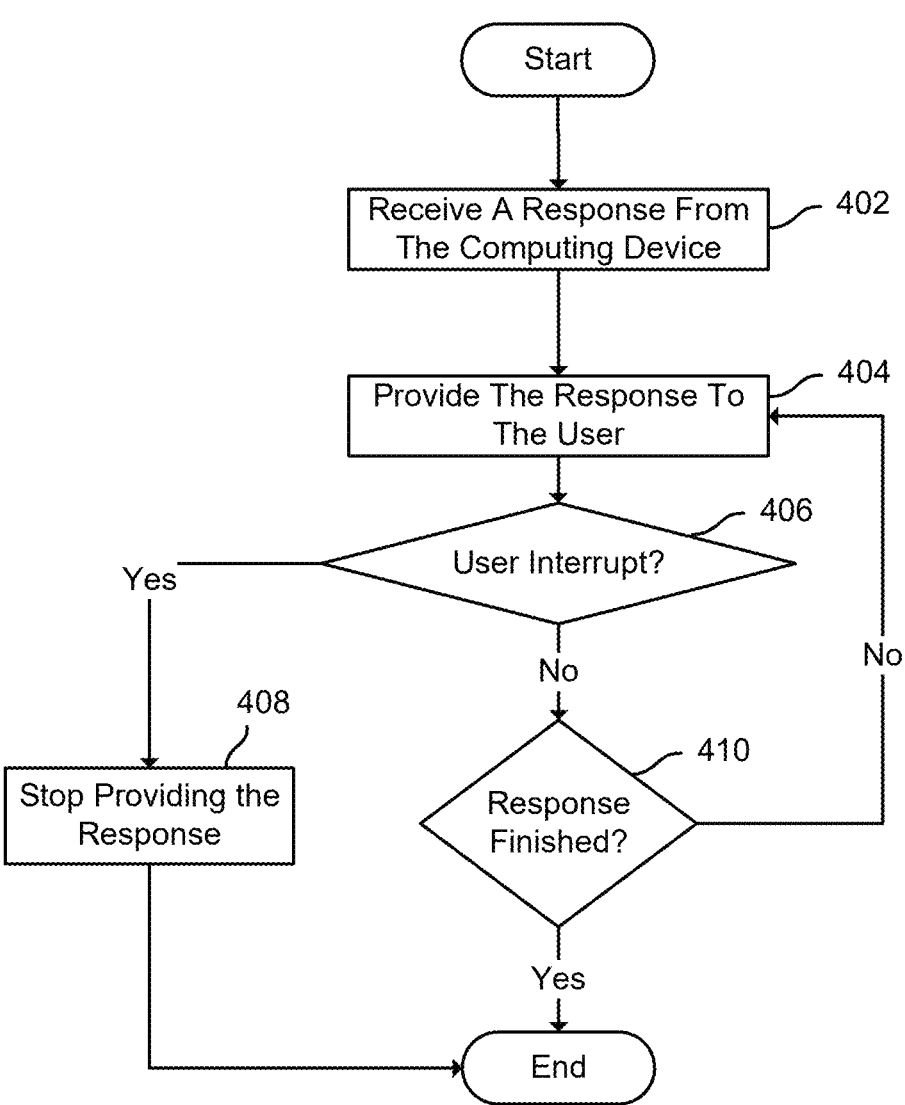
FIG. 4 is a flow diagram of providing a response from a computing device to a user in accordance with some embodiments.

FIG. 4 is a flow diagram of providing a response from a user to a computer in accordance with some embodiments. Process 400 may be executed by an interface device such as interface device 102. Process 400 may be executed on a system that can be worn on a finger such as system 200. Process 400 may be executed to perform all or part of 304.

At 402, a response from the computing device is received. The response may mimic natural human conversation in tone, structure, and contextual relevance, it may include appropriate emotional nuance and coherence. The response may be generated by an AI service which includes an LLM. In some embodiments, the response includes more information than the user would like to hear.

At 404, the response is provided to the user. The response may be provided to the user through a medium e.g., audio, text, visual output (e.g., photos and/or video), etc. In some embodiments, the response is provided through one or more mediums such as audio and text. In some embodiments, the response is provided to the user through a head-worn device, such as headphones. This allows the user to keep the interaction with the computing device private. This may be useful in public situations. In some embodiments, the response is provided to the user over a speaker such as the speaker of a mobile phone. In some embodiments, the response is provided to the user using text. In some embodiments, the user would like to interrupt the response. A device executing process 400 may allow a user to interrupt a response at any time while the response is being provided to the user.

At 406, it is determined whether a user interrupt is received while the response is provided to the user.

There may be one or more different types of user interrupts that can be received by the device, each user interrupt may dictate a different response from the device. For example, the user may interrupt the response by tapping the device. The user may also interrupt by tapping the device and then holding the tap (i.e., a press-and-hold), this user interrupt pattern may cause the device to stop the response and immediately begin accepting a second user audio input.

In some embodiments, a tap at 406 causes the device to proceed to 408 and stop providing the response. In some embodiments, a press-and-hold at 406 causes the device to stop providing the response and also configures the device to accept new user audio input. In this embodiment, 408 may proceed to step 356 of process 350.

The user may interrupt the response by tapping a second finger on the device which is on an adjacent finger (e.g., a thumb tapping the device on the index finger). The user may interrupt the response because the user's focus has shifted to something different. The user may interrupt the response because it is too long and the user wants to ask a clarifying question.

In response to a determination that the user interrupted the response, process 400 proceeds to 408. In response to a determination that the user has not interrupted the response, process 400 proceeds to 410.

At 410, it is determined whether the response being provided is finished. The provided response may be finished when the entirety of the response received at step 402 has been provided to the user. For example, when the whole of an AI service's response to a query has been provided to the user, the response is considered finished.

In response to a determination that the response has been finished, process 400 ends. In response to a determination that the response has not been finished, process 400 returns to 404.

At 408, the response is stopped being provided. For example, if the response is being provided in an audio format (e.g., a chat bot speaking to the user), the device cuts off the response. This can be done to silence the audio in the user's ear. In some embodiments, the user interrupts the response to provide more audio.

FIG. 5A-5C is a diagram of a user engaging in a multimodal interaction in accordance with some embodiments. FIGS. 5A-5C may represent the sequence of user 506 executing a motion to interact with interface device 508. In some embodiments, this sequence of motions can be a physical input. In some embodiments, in response to a motion a command is executed by interface device 508.

Cloud 502 represents a network which can exchange information with interface device 102. In some embodiments, cloud 502 hosts an AI service. This AI service may facilitate conversational interactions with user 506 through interface device 508.

Interface device 508 may be a finger-worn device. In some embodiments, interface device 508 includes a directional microphone and a physical input sensor. In some embodiments, interface device 508 is connected to head-worn device 504 and/or mobile device 510. In some embodiments, mobile device 510 is used to connect interface device 508 with head-worn device 504 and/or cloud 502.

Examples of a head-worn device 504 include: headphones, earphones, ear pieces, helmets, smart glasses, etc. Examples of a mobile device 510 include: mobile phones, tablet, smart phone, smart watches, laptops, e-readers, smart glasses, portable gaming consoles, a mobile general-purpose compute device, etc.

In some embodiments, FIG. 5A depicts user 506 in a crowded environment. At this time, user 506 wants to interact with cloud 502 and/or mobile device 510. For example, user 506 may want to ask an AI service a question. In another example, user 506 may want to ask a voice assistant on mobile device 510 a question. Thus, user 506 raises their arm and reaches the position depicted in FIG. 5B.

In the position depicted in FIG. 5B, user 506 may provide a physical input to interface device 508 and trigger it to be ready to receive an audio input (e.g., a voice command). For example, user 506 may ask for the directions to get somewhere. In another example, user 506 may be ask an AI service hosted in cloud 502 a more complicated question. After user 506 is satisfied with the user audio provided, user 506 may rest their arm thus returning to the depicted in FIG. 5A through the position depicted in FIG. 5C.

In some embodiments, user 506 raises interface device 508 to their lips and rapidly taps twice (FIG. 5B). The user then provides a physical input (e.g. a press+hold) and begins speaking. This may execute one or more commands/actions. Interface device 508 may first send a command mobile device 510, which may then send a command to head-worn device 504 to take in image. Interface device 508 may stream the microphone input from user 506 to mobile device 510. The stream of user 506 audio input may be sent to cloud 502 for processing.

In some embodiments, in the position depicted in FIG. 5C cloud 502 streams an audio response to mobile device 510 which is communicated to user 506 through head-worn device 504. User 506 may interrupt this audio playback at any time by performing additional inputs via interface device 508.

In some embodiments, head-worn device 504 includes a microphone that can receive user 506 audio input and send it to interface device 508. In some embodiments, interface device 508 is able to determine whether it is in the position depicted in FIG. 5A or the position depicted in FIG. 5B. Based on this determination, it can determine whether to use the microphone in head-worn device 504 or a microphone in interface device 508 to receive user audio input.

In some embodiments, interface device 508 executes a multimodal interaction in part by receiving input (e.g., visual data) from head-worn device 504. In some embodiments, head-worn device 504 captures one or more images. In some embodiments, the one or more images may be placed in a context window of an interaction and/or conversation with an AI service hosted in cloud 502 through a specified input primitive (e.g., a double swipe). This allows user 506 to immediately comment on the one or more images during the user's conversation with the AI service in cloud 502.

In some embodiments, a specified input is configured to capture one or more modes of interaction and provide both to an AI service in cloud 502 simultaneously. For example, a double tap and hold may cause the device to send a picture from head-worn device 504 to an AI service in cloud 502 and receive a user audio input, both of which are sent to an AI service in cloud 502 at the same time.

FIG. 6 is a diagram of input primitives which can be used to interact with a device in accordance with some embodiments. Input primitives 600 are actions that a user can take on a physical input sensor. The input primitives can be interpreted by the device which includes the physical input sensor to determine a command to initiate/execute. Input primitives 600 may be executed by a finger. Input primitives are the simplest inputs corresponding to gestures a user can perform to interact with a system (e.g., an interface device). FIG. 6 defines the inputs and the gestures along with visualizations.

In some embodiments, input primitives 600 are detected by the device when one or more conditions are met. In some embodiments, these one or more conditions may be detected by one or more different sensor suites. For example, a press-and-hold 606 may be detected by the device when a capacitance sensor detects a press and release and when an IMU sensor detects an impact.

In this diagram, input primitives 600 are described by words which describe the action and by a symbol which depicts the action. Tap 602 is defined by pressing a physical input sensor and releasing the press in less than a threshold (e.g., 1 ms). For example, if a physical input sensor senses a hold for less than 300 ms, it will interrupt the physical input as a tap. This is resembled by an open circle.

Double tap (DTap) 604 is defined as two taps in less than threshold of (e.g., 1 ms). This is resembled by two open circles.

Press+hold (or press and hold) 606 is defined as pressing a physical input sensor releasing after a threshold of milliseconds. For example, press+hold 606 may be defined as pressing the physical input and holding for longer than 300 ms, thus the device can differentiate from tap 602 and press+hold 606. Press+hold 606 is resembled by a dark circle with an arrow extruding out of it pointing to an empty circle with a dashed line. The dark circle represents the tap and hold while the next circle represents the release. In some embodiments, input primitive press+hold 606 is used to command an interface device to engage in a dynamic back-and-forth conversation. In some embodiments, the press+hold 606 is used to configure a microphone on an interface device to receive a user audio input.

Swipe Up/Down 608 is an input primitive where the user swipes on a physical input sensor up and/or down. This is represented by arrows pointing up or down. This input primitive may be used to turn up/down volume.

Hold+swipe 610 is an input primitive where the user presses (represented by the dark circle) and swipes up/down within a threshold of milliseconds (represented by an arrow up/down).

Double swipe 612 is an input primitive where the user executes two swipes within a threshold of milliseconds. Each of the two swipes may be in any direction (e.g., two up, two down, one up and one down, etc.) In some embodiments, different swipe permutations may lead to different actions by the device. In some embodiments, a double swipe causes the same action no matter the directions.

Input primitives 600 are only examples of inputs that can be provided to a device. In some embodiments, one or more input primitives 600 may be executed on a physical input sensor in any sequence to execute more complex commands.

In some embodiments, the device uses one or more IMU sensors to determine when the input primitive was provided and which input primitive the user has provided. The device may then use IMU sensor fusion to determine which physical input was executed by the user. An IMU sensor fusion allows the device to minimize false positives in determining which input primitive was intended by the user. In some embodiments, this is implemented by an IMU sensor on the device.

In some embodiments, the device is configured to require two conditions to be met for a certain input primitive to be detected. The device may use one or more IMU sensors and another sensor such as addition a capacitance touch sensor to determine whether an input primitive has been detected. For example, the IMU sensors may detect an impact while the capacitance touch sensor to detects that there was a press and release below a certain millisecond threshold, because these two conditions are met, the device will determine that a press-and-hold has occurred.

Figure 7:
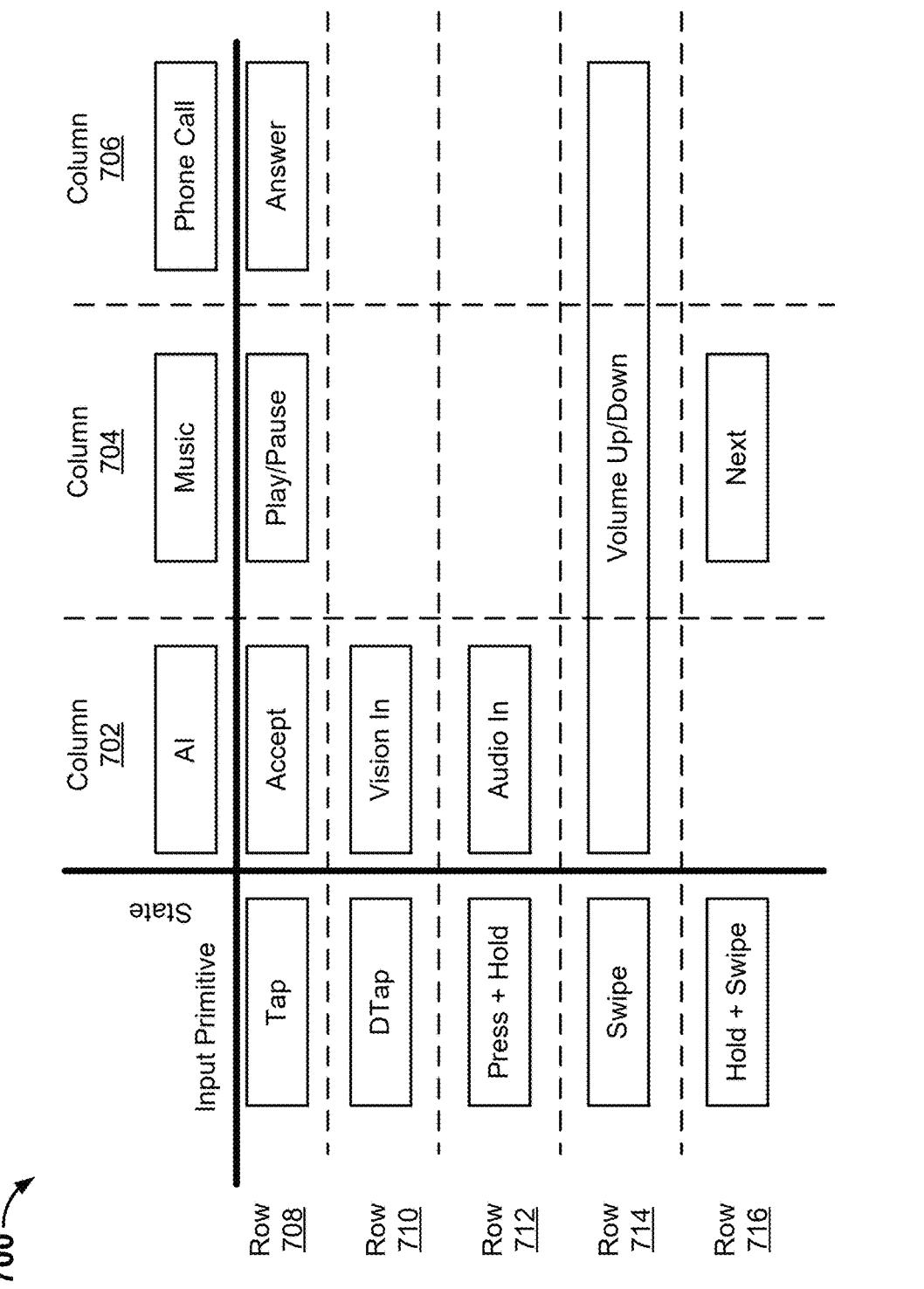
FIG. 7 is a table which demonstrates the actions a device can take given an input primitive and a state in accordance with some embodiments.

FIG. 7 is a table which demonstrates the actions a device can take given an input primitive and a state in accordance with some embodiments. The state of the device may be defined as the context of system usage. Example states include interacting with an AI as represented by column 702. Another example state is playing music which is represented by column 704. Another example state is being on a phone call which is represented by column 706. A phone call may be defined as any voice exchange the user and other users (e.g., a FaceTime™ call, a Skype™ call, a Zoom™ call/meeting, etc.). The input primitives may be received by the device at a physical input sensor. The command profile represented by table 702 may be configured to function on an interface device such as interface device 102.

Row 708 represents the input primitive of a tap. In some embodiments, a tap is defined by pressing a physical input sensor and releasing the press in less than a threshold millisecond. In column 702, where the state is AI, a tap may cause the device to accept an AI response. In some embodiments, a tap in the state of AI causes the device to begin recording a request from a user (e.g., an audio request received through a directional microphone). The tap of row 708 may cause music to play and/or pause when the device is in a music state, as represented in column 704. At the intersection of row 708 and column 706, the tap may cause the device to answer a phone call when the device is in a phone call state.

Row 710 represents the input primitive of a double tap (DTap). At the intersection of column 702 (state of AI) and row 710 the DTap may cause the AI to accept visual input. Visual input may be any visual information (e.g., a picture, video, live stream, etc.). In some embodiments, visual input is received from a head worn device such as smart glasses. In some embodiments, visual input is received from a mobile device such as a camera on a phone.

Row 712 represents the input primitive of a press+hold. This is considered a continuous input. In column 702, the state is AI and at this state, the input primitive of row 712 may cause the device to accept an audio input. In some embodiments, this audio input is accepted at a directional microphone.

Row 714 represents the input primitive of a swipe. In all states presented in table 700 a swipe can be used to either turn volume up or down. For example, a downward swipe may turn the volume down while an upward swipe may turn the volume up.

Row 716 represents the input primitive of a hold+swipe. In column 704, the state of the device is music and at this state, the input primitive of row 716 may cause the device to go to the next piece of music (e.g., go to the next song or the next album).

In some embodiments, the action that an input primitive causes in a given state is affected by the devices that are being used by the user. For example, the swipe input of row 812 may have resulted in the action of audio in, when the device is in the state AI, when there is a head worn device connected to the device accepting the input primitive. This configuration may exist because the device is able to facilitate an audio conversation between the user and an AI service given the fact the user is wearing a head-worn device. When the user is wearing/using a finger-worn device, the user input may cause the device to do a different action, such as record a memo.

Figure 8:
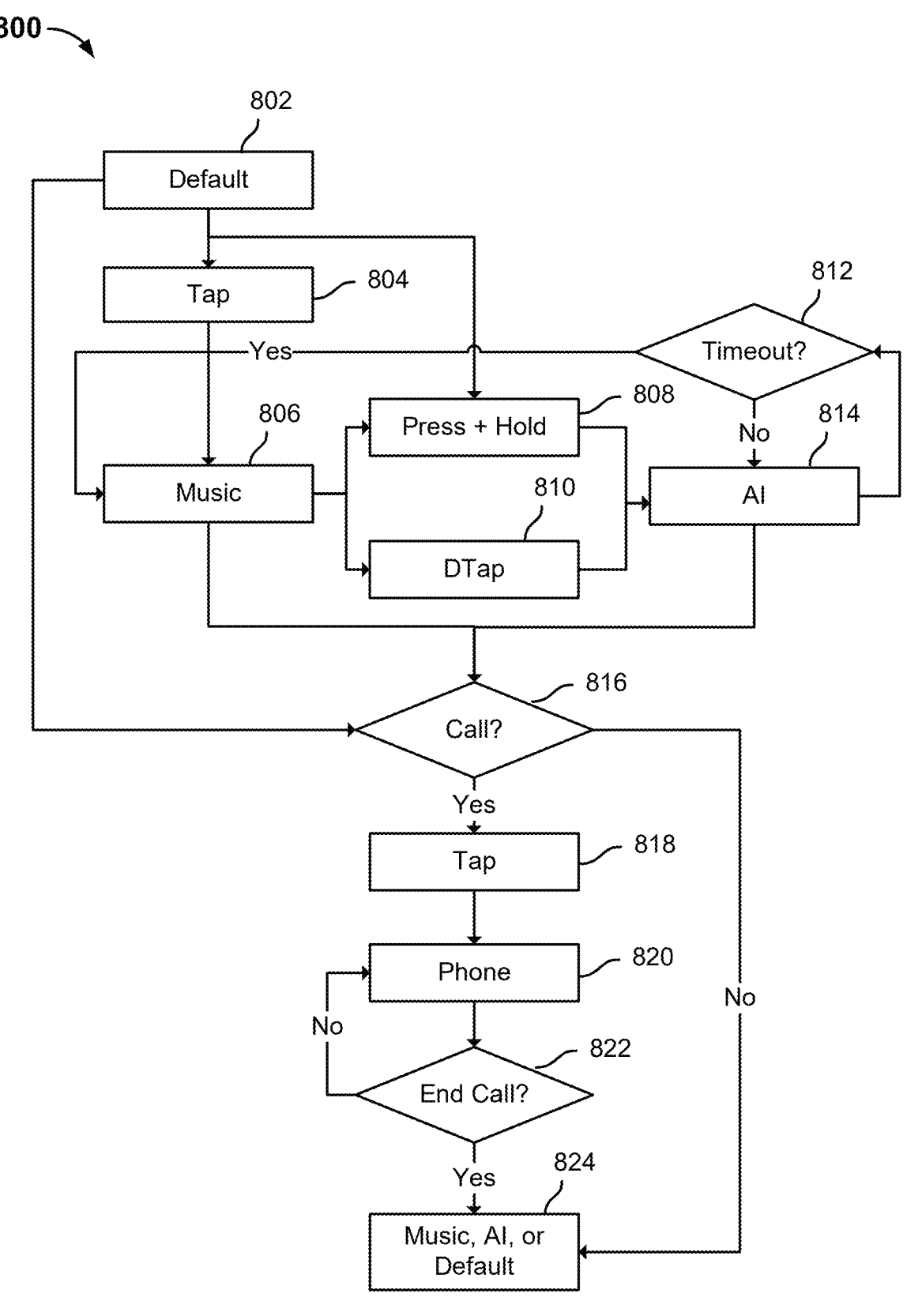
FIG. 8 is a flow diagram illustrating transitions between states in accordance with some embodiments.

FIG. 8 is a flow diagram illustrating transitions between states in accordance with some embodiments. Process 800 may be executed by an interface device such as interface device 102. The device executing process 800 may include a physical input sensor to receive physical inputs.

At 802, the device is in a default state. A default state includes when the device is on and is able to begin any interaction with the user. The device may be taken out of the default state through several different actions. The user may provide a physical input or the user may receive a call at the device. At 804, the device receives the physical input of a tap and this moves the device from the default state at 802 into a music state at 806. At 806, the device is in a music state where it is sending audio to the user (e.g., through a head worn device and/or a speaker device). At 808, the device receives a physical input of a press+hold which brings the device out of the default state at 802 into the AI state at 814. At 814, the device is in an AI state, this may mean the device is facilitating a conversation between the user and the AI. When the device receives the press+hold physical input at 808, it may be configured to accept an audio input from the user for the duration of the hold.

In the states, default 802, AI 814, or music 806, the device may receive a call. At 816, the device receives a call. Receiving a call may comprise receiving a request for an interaction between the user and another person. A call may be phone call or other types of interaction between the user and another person (e.g., a FaceTime™ call, a Skype™ call, a Zoom™ call/meeting, etc.). In response to the determination, that device receives a call, the device is configured to wait for a tap. The reception of a tap indicates to the device that the user would like to proceed with the call. The device will enter into the call state. At 818, the device receives the input primitive of a tap from the user, in response the device continues to 820. At 820, the device is a phone state. In a phone state, the device facilitates an interaction between the user and the person who initiated the call. At 822, the device awaits an end to the call. The call may be ended by the user, the person on the other end of the call, or through a technical difficulty (e.g., a disconnection). In response to a determination that the call has not ended, the device continues in the phone state and returns to 820. In response to a determination that the call has ended, the device returns to a state prior to the phone call. At 824, the device returns to either the music, AI, or default state. This depends on the state of the device prior to the call.

Referring back to 806, when the device is in the music state. The device may be taken out of the music state by receiving a call (and will proceed to 816), receiving the input primitive press+hold, or receiving the primitive input DTap. At 808, the device is in a music state and receives the input primitive press+hold, this changes the state of the device to the AI state. At 810, the device is in a music state and receives a DTap input primitive, this changes the state of the device to the AI state of 814.

At 812, the device is in the AI state and a timeout occurs. This may mean that the connection was lost (e.g., a connection is lost with an AI service). This may also occur because an input is received that indicates that a timeout must occur. In response to a determination that a timeout occurs, the device may return to the state it was in before the AI state. In this example, the previous state is the music state of 806.

FIG. 9 is a block diagram illustrating haptic triggers which correspond to haptic types in accordance with some embodiments. Configuration 900 may be programmed on an interface device such as interface device 102. The physical inputs may be received by a physical input sensor. The haptics may be delivered by a feedback indicators component. A haptic trigger is an input received by the device that when received, causes a corresponding haptic to occur.

When tapped (WT) 902 is a haptic trigger when the device has been tapped. This corresponds to the primary haptic 910. A tap is defined by pressing a physical input sensor and releasing the press in less than a threshold (e.g., 1 ms). When held (WH) 904 is a haptic trigger when the device has received a continuous physical input of being held. A holding is defined by holding a physical input sensor of a device for longer than a threshold of ms. This corresponds to primary haptic 910. When released (WR) 906 is a haptic trigger when the device senses that a hold (e.g., from WH 904) has been released. This may be defined as the user releasing pressure that is causing the device to understand that it is being held. This corresponds to primary haptic 910.

Primary haptic 910 is the physical sensory output of the device that occurs in response to device receiving any one of the physical inputs corresponding to primary haptic 910. Primary haptic 910 may be represented by a "1." For example, when the device is tapped (WT) the device may indicate to the user that it has received the physical input by responding with primary haptic 910. The haptic may be used to indicate to the user that the physical input was properly received. The user may understand which haptic corresponds to which physical input. Therefore, the user may be able to feel the device confirm that the physical input has been received by the device. A haptic may be any feedback relating to the sense of touch and/or proprioception. For example, a haptic may be a certain vibration pattern.

When swiped (WS) 908 is a haptic trigger when the device has received a physical input of a swipe. The swipe may be in the upwards direction or the downwards direction. This corresponds to secondary haptic 912. Secondary haptic 912 is a physical sensory output of the device, that is different from primary haptic 910. Secondary haptic 912 may be represented as a 2. Together, primary haptic 910 and secondary haptic 912 are used to inform the user that a certain physical input has been received by the device. This is possible because the haptics are different. The user can learn which haptic corresponds to which physical input in order to understand that the device has received this physical input. Primary haptic 910 and secondary haptic 912 may be different because they are different patterns of vibrations (e.g., primary haptic 910 vibrates once and secondary haptic 912 vibrates twice). In some embodiments, primary haptic 910 and secondary haptic 912 are different types of vibrations.

FIG. 10 is a block diagram illustrating input to haptic response mappings in accordance with some embodiments. Configuration 1000 corresponds a physical input with a haptic trigger and/or sequence of haptic triggers. Configuration 1000 may be programmed on an interface device such as interface device 102. The physical inputs may be received by a physical input sensor. The haptics may be delivered by a feedback indicators component. The "1" of haptic responses 1010, 1012, and 1014 may correspond to the primary haptic in configuration 900. The "2" of haptic response 1016 may correspond to the secondary haptic in configuration 900.

Tap 1002 indicates that a tap may result in the haptic trigger WT and cause a single haptic response of 1. This is described by haptic response 1010. DTap 1004 corresponds to haptic response 1012 and indicates that the haptic trigger WT occurs twice in succession when each tap of DTap occurs. In response to a WT, haptic 1 occurs. In this example, the user can be made aware that the user has successfully executed a DTap.

Press+hold 1006 indicates that the device has been pressed and then the pressure of the pressing has been held. This corresponds to haptic response 1014. Haptic response 1014 indicates that when the press begins (WH) haptic 1 occurs. When the hold is released (WR) haptic 1 occurs again.

Swipe Up/Down 1008 indicates that the device has received a physical input of a swipe in an upward direction or a downward direction. This corresponds to haptic response 1016. Haptic response 1016 indicates that when the swipe is sensed (WS), haptic 2 occurs.

Figure 11:
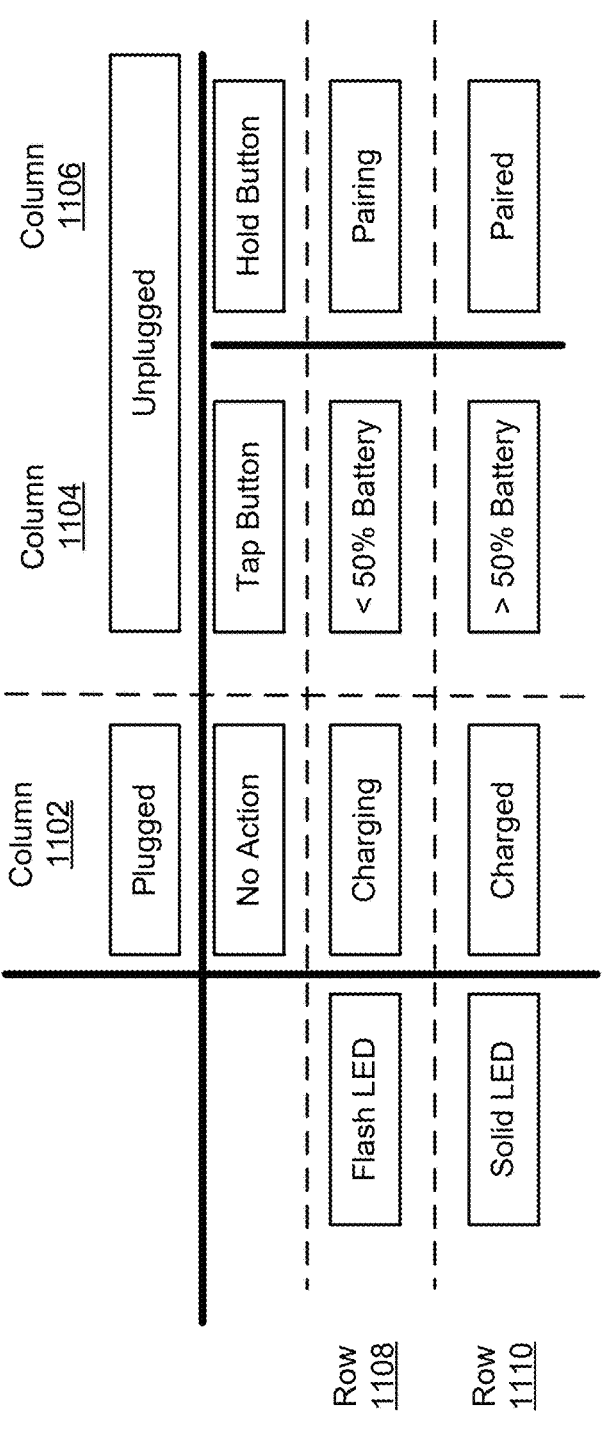
FIG. 11 is a block diagram illustrating case button LED operation patterns in accordance with embodiments.

FIG. 11 is a block diagram illustrating case button LED operation patterns in accordance with embodiments. In some embodiments, an interface device such as interface device 102 is associated with a case which houses it. This case can be used to facilitate providing power to the interface device. The case can be paired to all devices associated with the interface device including user devices such as mobile devices and head worn devices.

The case may be small enough to fit in a small bag or small enough to fit in a pocket. This enables rapid donning and removal of the wearable devices, which allows users to quickly transition based on: dynamic changes in mobile contexts (e.g. donning the devices when entering a subway, doffing when speaking to a storeowner) or dynamic changes in social contexts (e.g. donning the device when walking alone, doffing when one runs into a friend).

In some embodiments, the case is a unified case that is configured to accommodate multiple head-worn devices with integrated speakers and/or cameras and provide an interface device (e.g., a hand-worn input device). The unified case is designed to be compact and portable, enabling the multiple head-worn devices and the interface device to be easily carried in a bag or pocket. In some embodiments, the unified case maintains a form factor that enables easy donning and doffing of all components.

In some embodiments, a case-aware state management system is implemented. The case can detect when the head-worn and hand-worn devices are removed from or returned to the case. State management is facilitated based on whether each device is within the case or outside of the case.

Configuration 1100 is a table which indicates what an LED on a case button will do given certain states and physical inputs. Configuration 1100 may be programmed into a case that includes a button with an LED light.

In column 1102, the case is plugged in and there has been no action on the button. When the case is plugged in, it may be charging the case for future charging of a device that is housed in the case or it may be charging a device that is housed in the case through the case. In row 1108, the LED flashes. Flashing includes the LED turning on and off. The LED may flash in any pattern. At the intersection of row 1108 and column 1102, the LED is flashing because the case is plugged in and charging. Column 1104 is when the case is unplugged and the button on the case is tapped. At the intersection of row 1108 and column 1104 the LED flashes because the button is tapped, the case is unplugged, and the batter is lower than 50%. Column 1106 is when the case is unplugged, and the button is held. At the intersection of row 1108 and column 1106, the case is pairing. This may include facilitating the pairing of an interface device and a user device. It may include pairing the case with an interface device and/or a user device. While pairing, the LED is flashing.

In row 1110 the LED light is a solid continuous light. In the intersection of column 1102 and row 1110 the LED light is a solid because the case is charged while being plugged in. This indicates that the user can unplug the case and that it will have sufficient charge. At the intersection of row 1110 and column 1104 the button is tapped and the LED is solid. This occurs in a state when the case is unplugged and the battery is greater than 50%. In column 1106 the button is held and the LED is solid. This occurs when the case is unplugged and the case is paired.

In some embodiments, when the device is already paired and the device is inside the case, holding the button over a threshold of time and then releasing the button will reset the device. In some embodiments, this reset will allow the device to pair to another device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an annular member having a central opening;
a sensor included in the annular member and configured to detect a physical input from a user;

an inertial measurement unit (IMU) configured to output a signal indicative of an orientation and/or motion of the annular member in three-dimensional space;
a processor configured to:
receive an output from the sensor and the output from the IMU;
determine, based in part of the output of the IMU that the annular member is near a mouth of the user; and
in response to receiving an output from the sensor and the output from the IMU, determine a type of input primitive associated with the physical input based on the output from the sensor being received within a threshold of the output from the IMU;
a microphone included in the annular member and configured to receive audio from the user;
a communication interface included in the annular member and configured to provide the received audio to a computing device; and
a feedback indicator included in the annular member and configured to provide feedback to the user.

2. The system of claim 1, wherein the processor is further configured to:
determine that the physical input from the user is detected at the sensor;
provide, via the feedback indicator, feedback to the user indicating that the physical input was detected;
receive, via the microphone, the audio;
determine whether the physical input is still detected at the sensor; and
in response to a determination that the physical input is not detected at the sensor, provide the received audio, via the communication interface, to the computing device.

3. The system of claim 2, wherein the processor is further configured to:
provide, via the feedback indicator, feedback to the user indicating that the user audio has been received.

4. The system of claim 3, wherein the processor is configured to:
receive, via the communication interface, a response from the computing device at the communication interface; and
provide the response to the user.

5. The system of claim 4, wherein the response is received directly from the computing device.

6. The system of claim 4, wherein the response is received from the computing device via a user device.

7. The system of claim 4, wherein the processor is further configured to:
while the response is provided to the user, determine whether the user has interrupted the response.

8. The system of claim 7, wherein the processor is further configured to determine whether the response is finished in response to a determination that the user did not interrupt the response.

9. The system of claim 8, wherein the processor is further configured to provide the response to the user in response to a determination that the response is not finished.

10. The system of claim 7, wherein in response to the response being interrupted, the microphone is configured to receive new user audio from the user.

11. The system of claim 1, wherein the computing device includes an artificial intelligence (AI) service which includes a large language model (LLM).

12. The system of claim 11, wherein the AI service is configured to receive and respond to multimodal inputs from the user.

13. The system of claim 1, wherein the annular member is worn on a first finger and the sensor is positioned and configured to receive the physical input from the user via a second finger.

14. The system of claim 1, wherein the feedback indicator includes a motor.

15. The system of claim 1, wherein the feedback indicator provides haptic feedback to the user.

16. The system of claim 2, further comprising a second sensor, wherein the processor is further configured to:

detect, via the second sensor, a motion performed by the user; and in response to the detection of the motion performed by the user, execute a command.

17. A method, comprising:

detecting, by a sensor included in an annular member, a physical input from a user;

outputting, by an inertial measurement unit (IMU) included in the annular member, a signal indicative of an orientation and/or motion of the annular member in three-dimensional space;

receiving, by a processor included in the annular member, an output from the sensor and the output from the IMU;

determining, by the processor, based in part on the output of the IMU that the annular member is near a mouth of the user;

in response to receiving an output from the sensor and the output from the IMU, determining a type of input primitive associated with the physical input based on the output from the sensor being received within a threshold of the output from the IMU;

receiving, by a microphone included in the annular member, audio from the user;

providing, by a feedback indicator included in the annular member, feedback to the user; and providing, by a communication interface included in the annular member, the received audio to a computing device.

18. The method of claim 17, further comprising:

determining whether the physical input is still detected by the sensor included in an annular member;

providing, via the feedback indicator, feedback to the user indicating that a physical input has been detected;

receiving, via the microphone, the audio;

determining whether the physical input is still detected at the sensor; and in response to determining that the physical input is not detected, providing, via the communication interface included in the annular member, the received audio to a computing device.

19. A computer program product embodied in a non-transitory computer readable medium and comprising computer instructions for:

detecting, by a sensor included in an annular member, a physical input from a user;

outputting, by an inertial measurement unit (IMU) included in the annular member, a signal indicative of an orientation and/or motion of the annular member in three-dimensional space;

receiving, by a processor included in the annular member, an output from the sensor and the output from the IMU;

determining, by the processor, based in part on the output of the IMU that the annular member is near a mouth of the user;

in response to receiving an output from the sensor and the output from the IMU, determining a type of input primitive associated with the physical input based on the output from the sensor being received within a threshold of the output from the IMU;

providing, by a feedback indicator included in the annular member, feedback to the user indicating that a command associated with the physical input was initiated; and providing, by a communication interface included in the annular member, the received audio to a computing device.

\* \* \* \* \*